United States Patent
Kaku et al.

(10) Patent No.: US 9,648,195 B2
(45) Date of Patent: May 9, 2017

(54) IMAGE CAPTURING APPARATUS AND IMAGE CAPTURING METHOD

(71) Applicant: CANON KABUSHIKI KAISHA, Tokyo (JP)

(72) Inventors: Wataru Kaku, Yokohama (JP); Keita Takatani, Yokohama (JP); Kazuhiro Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 106 days.

(21) Appl. No.: 14/528,122

(22) Filed: Oct. 30, 2014

(65) Prior Publication Data

US 2015/0124121 A1 May 7, 2015

(30) Foreign Application Priority Data

Nov. 6, 2013 (JP) ................................ 2013-230525

(51) Int. Cl.
| | |
|---|---|
| H04N 5/76 | (2006.01) |
| H04N 1/21 | (2006.01) |
| H04N 5/232 | (2006.01) |
| G06K 9/46 | (2006.01) |
| G06K 9/00 | (2006.01) |
| H04N 5/225 | (2006.01) |

(52) U.S. Cl.
CPC ....... *H04N 1/2108* (2013.01); *G06K 9/00536* (2013.01); *G06K 9/46* (2013.01); *H04N 5/2258* (2013.01); *H04N 5/23222* (2013.01); *H04N 5/23229* (2013.01); *H04N 5/23245* (2013.01); *G06K 9/00302* (2013.01); *G06K 9/00664* (2013.01)

(58) Field of Classification Search
None
See application file for complete search history.

(56) References Cited

FOREIGN PATENT DOCUMENTS

| | | |
|---|---|---|
| JP | 2010-148052 A | 7/2010 |
| WO | 2006/028172 A | 3/2006 |

*Primary Examiner* — Stephen Coleman
(74) *Attorney, Agent, or Firm* — Cowan, Liebowitz & Latman, P.C.

(57) ABSTRACT

There is provided an image capturing apparatus. A first image capturing unit captures an image of a subject to generate image data. A second image capturing unit captures an image of a user who captures the image of the subject, for a predetermined period before and after the image of the subject is captured. An obtainment unit obtains first classification information by analyzing, in the image captured by the second image capturing unit, each of a state of the user before the image of the subject is captured and a state of the user after the image of the subject is captured. A recording unit records the first classification information in association with the image data.

12 Claims, 6 Drawing Sheets

IMAGE CAPTURING APPARATUS AND IMAGE CAPTURING METHOD

BACKGROUND OF THE INVENTION

Field of the Invention

The present invention relates to an image capturing apparatus and an image capturing method.

Description of the Related Art

An image capturing apparatus that adds, to a captured image, information relating to the state during image capturing and records the captured image with the information is known. A recording apparatus disclosed in International Publication No. 2006/028172 starts temporary storage of a moving image, when the recording apparatus is set to a mode of capturing a still image with a moving image. When a shutter button is pressed, the recording apparatus records a captured still image, and also generates one moving image from a moving image temporarily stored before the still image is captured, a moving image obtained by converting the captured still image, and a moving image captured after the shutter button is pressed and records the generated moving image. The technique disclosed in International Publication No. 2006/028172 thus enables recognition of the state of the subject at and before and after image capturing.

A camera-equipped mobile terminal disclosed in Japanese Patent Laid-Open No. 2010-148052 determines the facial expression of a user who captures the image of the subject from the image of the user captured by a front-facing camera, and performs a shutter operation of a rear-facing camera based on the determined information. The camera mobile terminal classifies the image captured by the rear-facing camera according to the degree of the user's facial expression, and displays the image. The technique disclosed in Japanese Patent Laid-Open No. 2010-148052 thus enables recognition of the user's facial expression at the time of capturing the image by the rear-facing camera.

However, International Publication No. 2006/028172 does not disclose a technique of capturing the image of the user, and so the state of the user during image capturing cannot be recognized. Japanese Patent Laid-Open No. 2010-148052 discloses a technique of storing image data in association with a maximum degree of smile during a determination time from when a shutter operation is performed, but does not take into consideration the user's facial expression (state) before image capturing. The user's facial expression (state) and its change before and after image capturing cannot be recognized with the technique disclosed in Japanese Patent Laid-Open No. 2010-148052.

SUMMARY OF THE INVENTION

The present invention has been made in view of such circumstances, and provides a technique with which the state of the user when capturing the image of the subject can be recognized in more detail than with conventional techniques.

According to an aspect of the present invention, there is provided an image capturing apparatus comprising: a first image capturing unit configured to capture an image of a subject to generate image data; a second image capturing unit configured to capture an image of a user who captures the image of the subject, for a predetermined period before and after the image of the subject is captured; an obtainment unit configured to obtain first classification information by analyzing, in the image captured by the second image capturing unit, each of a state of the user before the image of the subject is captured and a state of the user after the image of the subject is captured; and a recording unit configured to record the first classification information in association with the image data.

According to another aspect of the present invention, there is provided an image capturing apparatus comprising: an image capturing unit configured to capture an image of a subject to generate image data; a voice collection unit configured to collect, for a predetermined period before and after the image of the subject is captured, voice of a user who captures the image of the subject, to generate voice data; an obtainment unit configured to obtain classification information, by analyzing each of a part of the voice data corresponding to the voice collected before the image of the subject is captured and a part of the voice data corresponding to the voice collected after the image of the subject is captured; and a recording unit configured to record the classification information in association with the image data.

According to yet another aspect of the present invention, there is provided an image capturing method by an image capturing apparatus, the image capturing method comprising: a first image capturing step of capturing an image of a subject to generate image data; a second image capturing step of capturing an image of a user who captures the image of the subject, for a predetermined period before and after the image of the subject is captured; an obtainment step of obtaining first classification information by analyzing, in the image captured in the second image capturing step, each of a state of the user before the image of the subject is captured and a state of the user after the image of the subject is captured; and a recording step of recording the first classification information in association with the image data.

According to another aspect of the present invention, there is provided an image capturing method by an image capturing apparatus, the image capturing method comprising: an image capturing step of capturing an image of a subject to generate image data; a voice collection step of collecting, for a predetermined period before and after the image of the subject is captured, voice of a user who captures the image of the subject, to generate voice data; an obtainment step of obtaining classification information, by analyzing each of a part of the voice data corresponding to the voice collected before the image of the subject is captured and a part of the voice data corresponding to the voice collected after the image of the subject is captured; and a recording step of recording the classification information in association with the image data.

Further features of the present invention will become apparent from the following description of exemplary embodiments with reference to the attached drawings.

DESCRIPTION OF THE EMBODIMENTS

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

First Embodiment

If captured image data is recorded in association with information relating to the state of the user during image capturing, the user can enjoy recalling the situation during image capturing when viewing the image data later, or search for the image data based on the situation during image capturing. Information associated with image data according to the technique disclosed in Japanese Patent Laid-Open No. 2010-148052 described above is, however, insufficient to indicate the state of the user, for the following reason. The user reacts in various ways (facial expression, voice, movement, etc.) to various situations before and after the shutter operation, and the state of the user may change significantly between before and after the shutter operation.

For example, the state of the user before and after the shutter operation has any of the following four patterns.

(1) The user was smiling throughout image capturing (including before and after the shutter operation).

(2) The user was smiling before image capturing, but stopped smiling after image capturing.

(3) The user was not smiling before image capturing, but smiled after image capturing.

(4) The user was not smiling throughout image capturing (including before and after the shutter operation).

The pattern (1) suggests, for example, that the user captured the image in a pleasant situation. The pattern (2) suggests a possibility that the user captured the image in a pleasant situation but, upon viewing the rec review display of the captured image data, noticed that a good photograph was not taken. The pattern (3) suggests a possibility that, though the image capturing situation itself was not so pleasant to make the user smile, the user noticed that a good photograph (or a pleasant photograph) was taken upon viewing the rec review display of the captured image data. The pattern (4) suggests, for example, that the user captured the image in a serious atmosphere.

To facilitate detailed recognition of the situation during image capturing, this embodiment describes a technique of analyzing the state of the user from the video of the user captured before and after the shutter operation and recording the analysis result. An operation mode in which an image capturing apparatus performs image capturing accompanied by such analysis and recording is referred to as "classification addition mode".

Figure 1A:
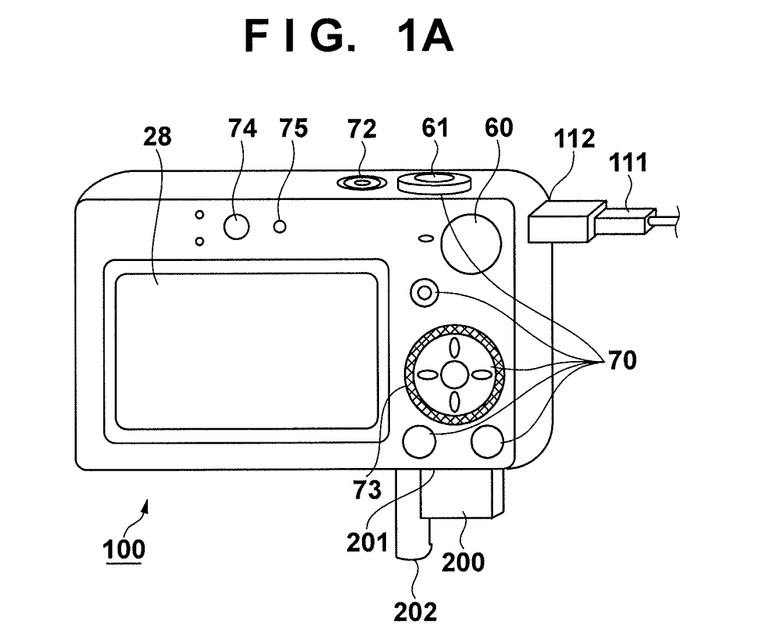
FIG. 1A is an appearance diagram showing a digital camera 100 according to a first embodiment.
Figure 1B:
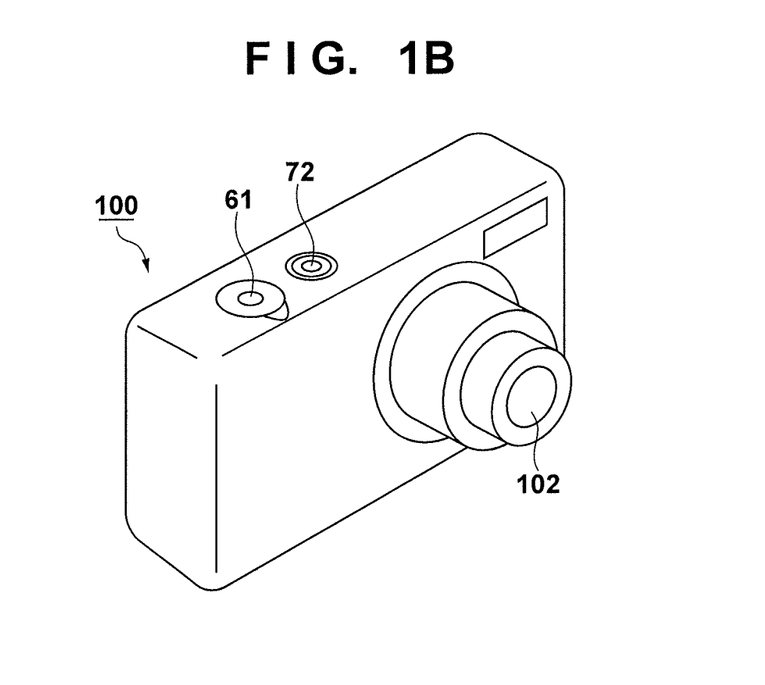
FIG. 1B is an appearance diagram showing the digital camera 100 according to the first embodiment.

The following describes an embodiment in which an image capturing apparatus according to the present invention is applied to a digital camera. FIGS. 1A and 1B are each an appearance diagram showing a digital camera 100 according to a first embodiment. FIG. 1A is a back view, and FIG. 1B is a front perspective view (seen from top left).

In FIGS. 1A and 1B, a back camera 74 is provided on the back of the body of the digital camera 100, and captures the image of the user. A microphone 75 collects, when capturing a moving image by the back camera 74, ambient voice (mainly the user's voice) to be included in the captured moving image data. A display unit 28 is a display unit for displaying images and various kinds of information. A shutter button 61 is an operation unit for instructing the digital camera 100 to capture an image of a subject through a lens 103 provided on the front of the body of the digital camera 100. A mode selection switch 60 is an operation unit for switching between various modes. A connector 112 is a connector between a connection cable 111 and the digital camera 100. An operation unit 70 is an operation unit made up of operation members such as various switches, buttons, and a touch panel for receiving various operations from the user. A controller wheel 73 is a rotatable operation member included in the operation unit 70. A power switch 72 is a power switch for switching between power-on and power-off.

A recording medium 200 is a recording medium such as a memory card or a hard disk. A recording medium slot 201 is a slot for housing the recording medium 200. The recording medium 200 housed in the recording medium slot 201 is capable of communicating with the digital camera 100. A cover 202 is the cover of the recording medium slot 201.

Figure 2:
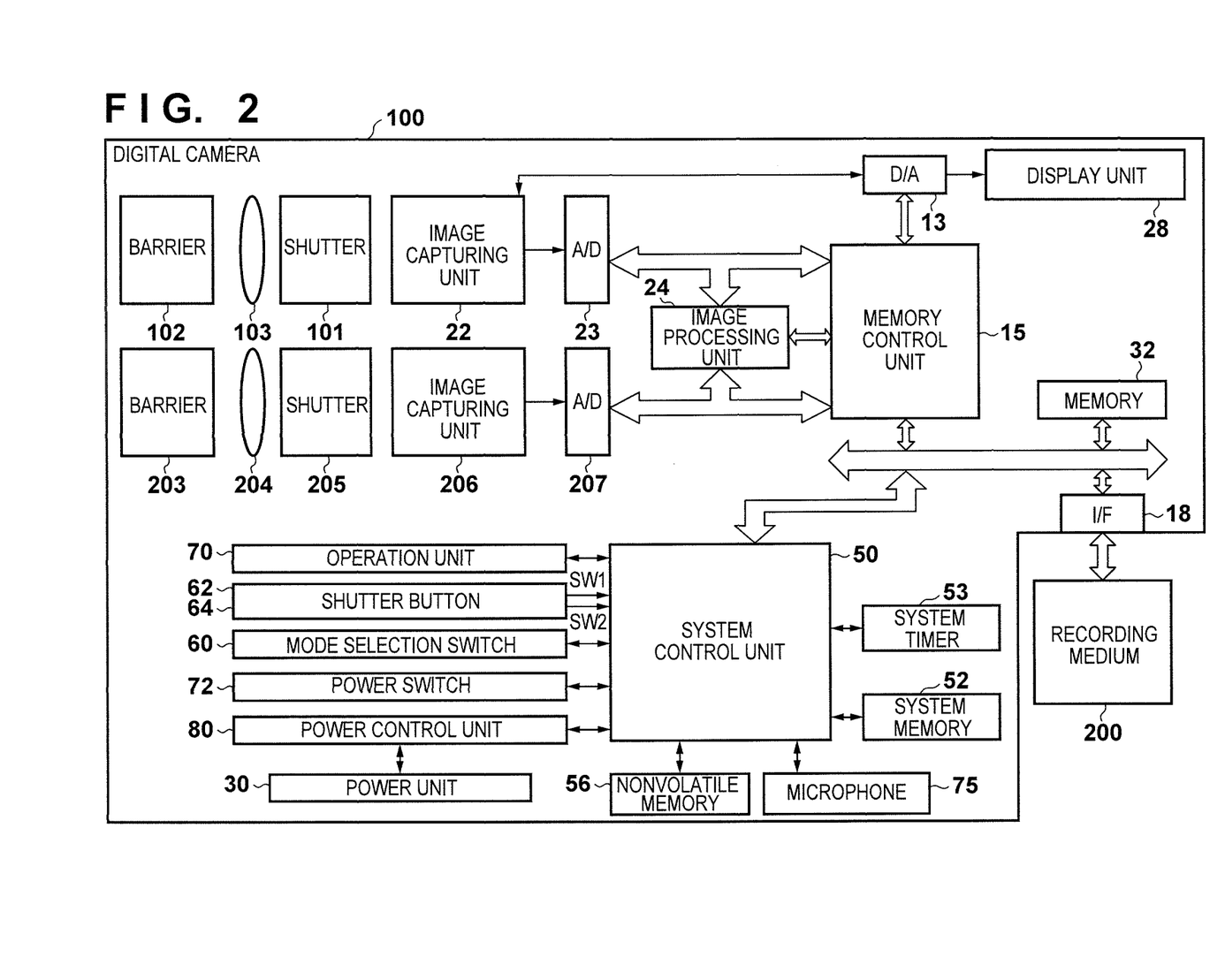
FIG. 2 is a block diagram showing an example configuration of the digital camera 100.

FIG. 2 is a block diagram showing an example configuration of the digital camera 100. In FIG. 2, image capturing lenses 103 and 204 each include a focus lens. Shutters 101 and 205 each have a diaphragm function. Image capturing units 22 and 206 each include a CCD, a CMOS element, or the like for converting an optical image to an electrical signal. A/D converters 23 and 207 each convert an analog signal to a digital signal. The A/D converter 23 converts an analog signal output from the image capturing unit 22 to a digital signal, and the A/D converter 207 converts an analog signal output from the image capturing unit 206 to a digital signal. In the digital camera 100, the image capturing lens 103, the shutter 101, the image capturing unit 22, and the A/D converter 23 constitute a first image capturing system for capturing the image of the subject, and the image capturing lens 204, the shutter 205, the image capturing unit 206, and the A/D converter 207 constitute a second image capturing system for capturing the image of the user who captures the image of the subject. Barriers 102 and 203 respectively cover the first and second image capturing systems of the digital camera 100, to keep the image capturing lenses 103 and 204 and the like from stains or damage.

An image processing unit 24 performs a predetermined resizing process such as pixel interpolation or reduction, color conversion process, etc., on data from the A/D converters 23 and 207 or data from a memory control unit 15. The image processing unit 24 also performs a predetermined computation process using captured image data, and a system control unit 50 performs exposure control and distance measurement control based on the obtained computation result. A through-the-lens (TTL) autofocus (AF) process, an automatic exposure (AE) process, and a flash pre-emission (EF) process are thus carried out. The image processing unit 24 further performs a predetermined computation process using captured image data, and carries out a TTL automatic white balance (AWB) process based on the obtained computation result.

Data output from the A/D converters 23 and 207 are directly written to a memory 32, via the image processing unit 24 and the memory control unit 15 or via the memory control unit 15. The memory 32 stores image data obtained by the image capturing units 22 and 206 and converted to digital data by the A/D converters 23 and 207, and image data for display on the display unit 28. The memory 32 has a sufficient storage capacity to store a predetermined number of still images or a predetermined time length of moving images and voice. The memory 32 also serves as a memory (video memory) for image display.

A D/A converter 13 converts image data for display stored in the memory 32 to an analog signal, and supplies the analog signal to the display unit 28. The image data for display written in the memory 32 is thus displayed on the display unit 28 via the D/A converter 13. The display unit 28 produces display corresponding to the analog signal from the D/A converter 13, on a display device such as an LCD.

A nonvolatile memory 56 is an electrically erasable recordable memory, and is an EEPROM or the like as an example. The nonvolatile memory 56 stores a program, constants, and the like for the operation of the system control unit 50. The program mentioned here is a program for executing various flowcharts in this embodiment described later.

The system control unit 50 controls the entire digital camera 100. The system control unit 50 executes the program recorded in the nonvolatile memory 56 mentioned above, to realize each process in this embodiment described later. A system memory 52 is a RAM. The program read from the nonvolatile memory 56, the constants and variables for the operation of the system control unit 50, and the like are expanded in the system memory 52. The system control unit 50 also controls the memory 32, the D/A converter 13, the display unit 28, and the like, to perform display control. A system timer 53 is a timer unit for measuring the time used for each control or the time of an internal clock.

The mode selection switch 60, a first shutter switch 62, a second shutter switch 64, and the operation unit 70 are operation units for inputting various operation instructions to the system control unit 50. The mode selection switch 60 switches the operation mode of the system control unit 50 to any of a still image recording mode, a moving image recording mode, the classification addition mode, a playback mode, and the like. The first shutter switch 62 is turned on by a half press (image capturing preparation instruction) halfway through the operation of the shutter button 61 provided on the digital camera 100, and generates a first shutter switch signal SW1. The system control unit 50 starts the operations of the AF process, the AE process, the AWB process, the EF process, and the like by the first image capturing system, according to the first shutter switch signal SW1. The second shutter switch 64 is turned on by a full press (image capturing instruction) upon completion of the operation of the shutter button 61, and generates a second shutter switch signal SW2. The system control unit 50 starts the operations of the series of image capturing processes by the first image capturing system from reading a signal from the image capturing unit 22 to writing image data to the recording medium 200, according to the second shutter switch signal SW2.

The operation members in the operation unit 70 are assigned appropriate functions depending on scene to serve as various function buttons, for example when the user selectively operates various function icons displayed on the display unit 28. Examples of the function buttons include an end button, a return button, an image forward button, a jump button, a narrow-down button, an attribute change button, etc. For instance, when a menu button is pressed, a menu screen through which various settings can be made is displayed on the display unit 28. The user can make various settings intuitively, using the menu screen displayed on the display unit 28 and a 4-direction button, a set button, and the like. The controller wheel 73 (see FIG. 1A) is a rotatable operation member included in the operation unit 70, and is used together with the direction button when, for example, designating a selection item. When the controller wheel 73 is rotated, an electrical pulse signal is generated according to the amount of rotation operation, and the system control unit 50 controls each unit in the digital camera 100 based on the generated pulse signal. The angle to which the controller wheel 73 has been rotated, how many turns the controller wheel 73 has been rotated, or the like can be determined from the pulse signal. The controller wheel 73 may be any operating member so long as its rotation operation is detectable. As an example, the controller wheel 73 may be a dial operation member that rotates according to the rotation operation by the user and generates the pulse signal. As another example, the controller wheel 73 may be an operation member composed of a touch sensor that does not rotate but detects the rotation operation of the user's finger or the like on the controller wheel 73 (i.e. a touch wheel).

A power control unit 80 includes a battery detection circuit, a DC-DC converter, a switch circuit for switching the block to be energized, and the like, and detects whether or not a battery is mounted, the type of the battery, and the remaining battery level. The power control unit 80 controls the DC-DC converter based on the detection result and an instruction from the system control unit 50, to supply a necessary voltage to each unit including the recording medium 200 for a necessary period. A power unit 30 includes a primary battery such as an alkaline battery or a lithium battery, a secondary battery such as a NiCd battery, a NIMH battery, or a Li battery, an AC adaptor, and so on.

An interface (I/F) 18 is an interface with the recording medium 200 such as a memory card or a hard disk. The recording medium 200 is a recording medium such as a memory card, and is composed of a semiconductor memory, a magnetic disk, or the like.

Figure 3A:
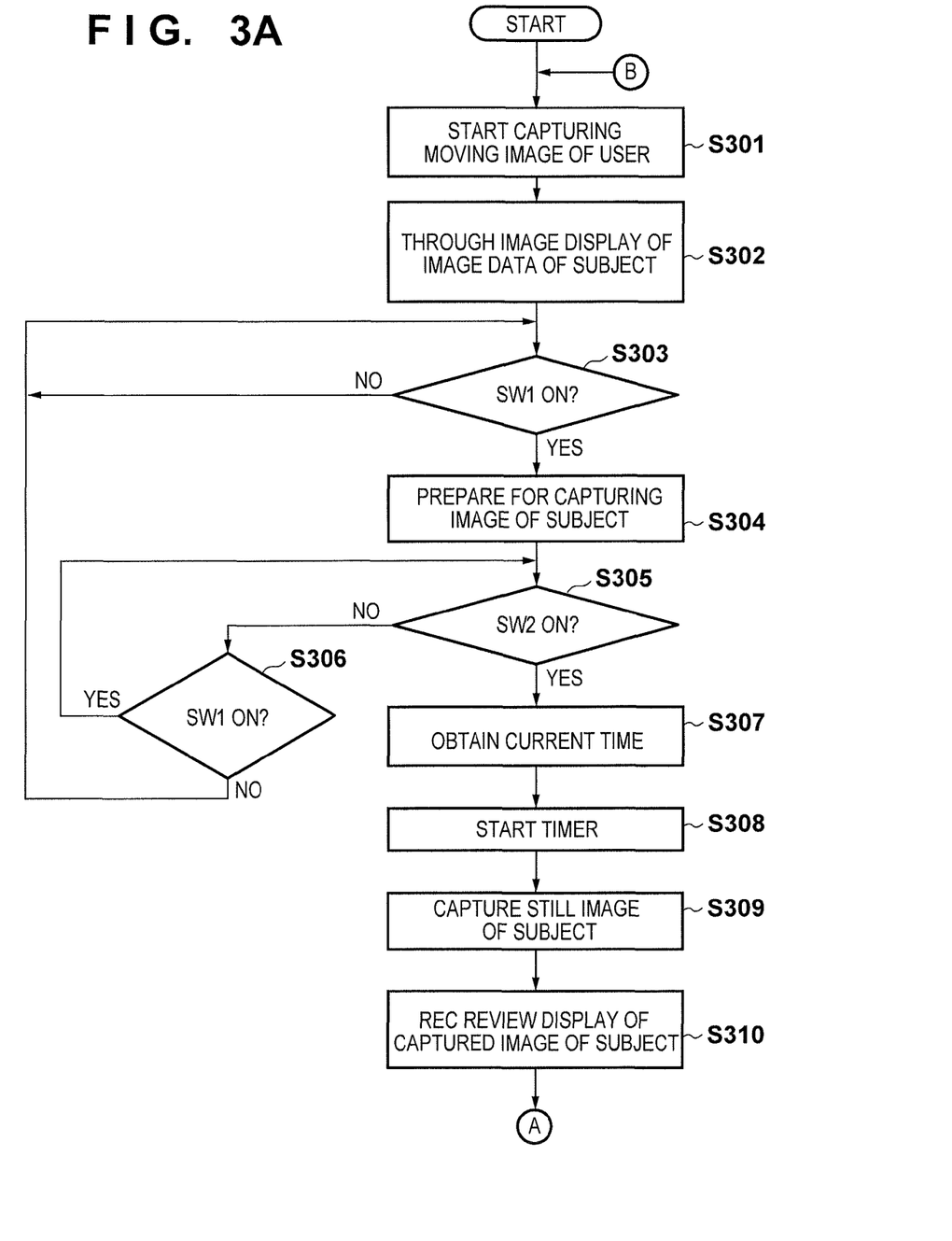
FIG. 3A is a flowchart showing an image capturing process in a classification addition mode by the digital camera 100.
Figure 3B:
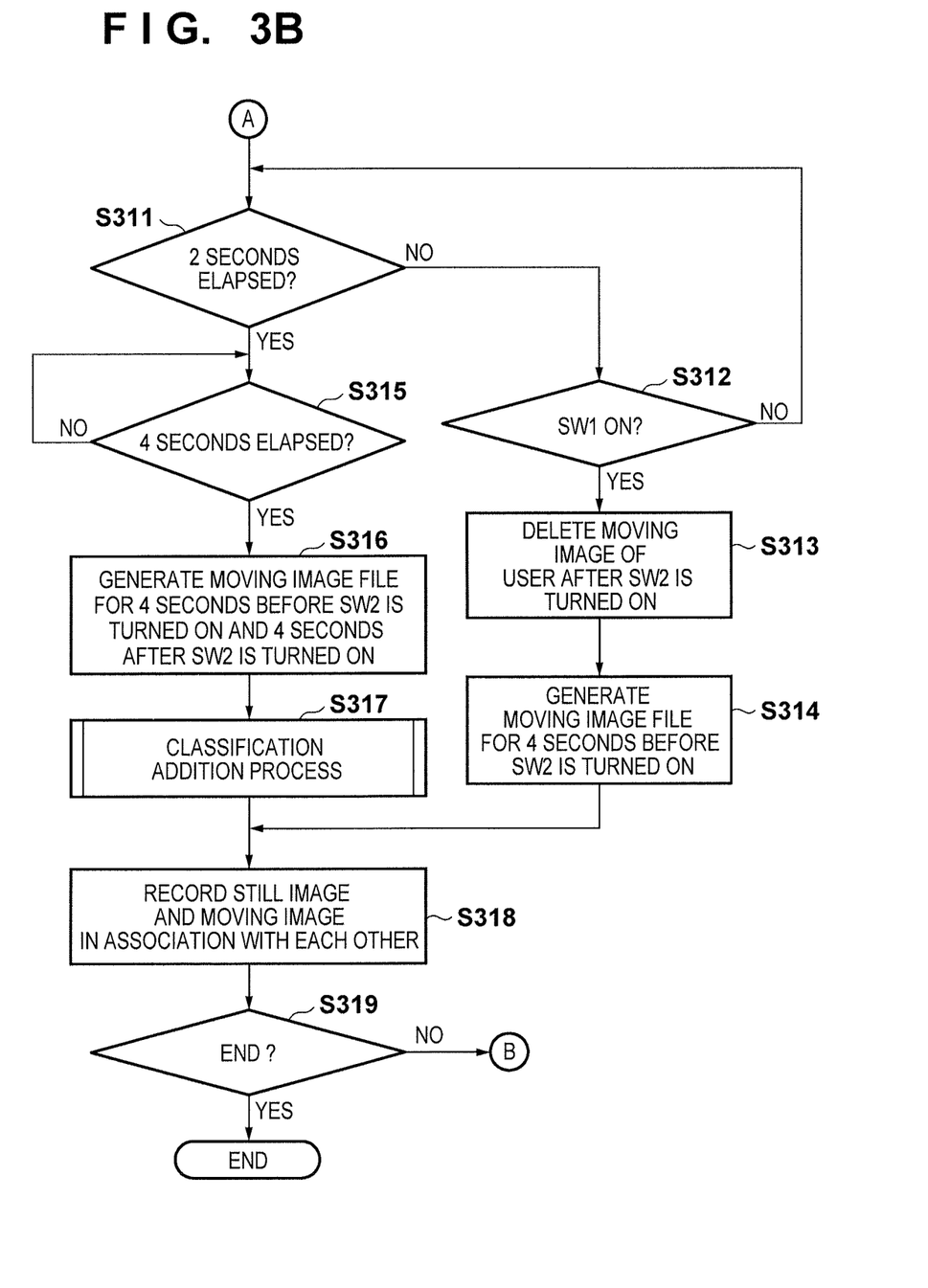
FIG. 3B is a flowchart showing the image capturing process in the classification addition mode by the digital camera 100.

FIGS. 3A and 3B are each a flowchart showing the image capturing process in the classification addition mode by the digital camera 100. Each process in this flowchart is realized by the system control unit 50 expanding, in the system memory 52, the program stored in the nonvolatile memory 56 and executing the program. The process of the flowchart starts from a state when the mode selection switch 60 is switched to the classification addition mode.

In step S301, the system control unit 50 controls the second image capturing system to start the process of capturing the moving image of the user, and controls the memory control unit 15 to record the captured moving image data in the memory 32. The system control unit 50 also generates voice data based on the voice collected by the microphone 75. The maximum time length of moving image data recorded in the memory 32 is set to, for example, 8 seconds (4 seconds before SW2 is turned on and 4 seconds after SW2 is turned on). In the case where the time length of moving image data recorded in the memory 32 exceeds the maximum time length, the system control unit 50 controls the memory control unit 15 to sequentially delete frames with earlier image capturing times.

Though the moving image of the user is a moving image with voice and voice data is included in moving image data in this embodiment, voice data and moving image data may be processed separately. Moreover, the digital camera 100 may obtain only voice data, without obtaining moving image data. In such a case, the expressions such as "moving image data" and "moving image file" in this embodiment are read appropriately as "voice data" and "voice file".

In step S302, the system control unit 50 controls the display unit 28 to display image data (the image data of the subject) from the image capturing unit 22 in the first image capturing system (through image display). In step S303, the system control unit 50 determines whether or not the first shutter switch signal SW1 is on. In the case where the first shutter switch signal SW1 is off, the system control unit 50 repeats the process of step S303. In the case where the first shutter switch signal SW1 is on, the system control unit 50 advances the process to step S304.

In step S304, the system control unit 50 controls the first image capturing system to prepare for image capturing. The image capturing preparation mentioned here is a process for enabling proper image capturing, and includes the operations of the AF process, the AE process, the AWB process, the EF process, and the like.

In step S305, the system control unit 50 determines whether or not the second shutter switch signal SW2 is on. In the case where the second shutter switch signal SW2 is off, the process advances to step S306. In the case where the second shutter switch signal SW2 is on, the process advances to step S307.

In step S306, the system control unit 50 determines whether or not the first shutter switch signal SW1 is on. In the case where the first shutter switch signal SW1 is off, the process returns to step S303. In the case where the first shutter switch signal SW1 is on, the process returns to step S305.

In step S307, the system control unit 50 obtains the current time from the system timer 53, and records the obtained current time as the time at which the second shutter switch signal SW2 is turned on. In step S308, the system control unit 50 controls the system timer 53 to count the time elapsed from when the second shutter switch signal SW2 is turned on.

In step S309, the system control unit 50 controls the first image capturing system to capture the still image of the subject. In step S310, the system control unit 50 controls the display unit 28 to display (rec review display) the still image captured in step S309. The rec review display is a process of displaying the image data on the display unit 28 for a predetermined time (review time) so that the user checks the captured image.

In step S311, the system control unit 50 obtains the current time from the system timer 53, and determines whether or not 2 seconds have elapsed from when the second shutter switch signal SW2 is turned on. In the case where 2 seconds have not elapsed, the process advances to step S312. In the case where 2 seconds have elapsed, the process advances to step S315.

In step S312, the system control unit 50 determines whether or not the first shutter switch signal SW1 is on. In the case where the first shutter switch signal SW1 is off, the process returns to step S311. In the case where the first shutter switch signal SW1 is on, the process advances to step S313.

In step S313, the system control unit 50 performs control so that the moving image of the user captured by the second image capturing system after the second shutter switch signal SW2 is turned on is deleted. In step S314, the system control unit 50 generates a file (moving image file) of moving image data captured by the second image capturing system for 4 seconds before the second shutter switch signal SW2 is turned on, and advances the process to step S318.

In step S315, the system control unit 50 obtains the current time from the system timer 53, and determines whether or not 4 seconds have elapsed from when the second shutter switch signal SW2 is turned on. In the case where 4 seconds have not elapsed, the system control unit 50 repeats the process of step S315. In the case where 4 seconds have elapsed, the system control unit 50 advances the process to step S316.

In step S316, the system control unit 50 generates a moving image file of moving image data captured by the second image capturing system for 8 seconds (a predetermined period before and after image capturing) made up of 4 seconds before the second shutter switch signal SW2 is turned on and 4 seconds after the second shutter switch signal SW2 is turned on.

In step S317, the system control unit 50 performs a process (classification addition process) of analyzing the moving image file generated in step S316 and recording information based on the analysis result. The classification addition process will be described in detail later, with reference to FIG. 4.

In step S318, the system control unit 50 records a file (still image file) of still image data of the subject captured by the first image capturing system and a moving image file of moving image data of the user captured by the second image capturing system, in association with each other. The form in which the still image file and the moving image file are recorded in association with each other will be described later, with reference to FIGS. 5 and 6.

In step S319, the system control unit 50 determines whether or not a given end condition is satisfied. Examples of the given end condition include: the system control unit 50 detecting the switching of the mode selection switch 60 to another image capturing mode; and the system control unit 50 detecting the press of the power switch 72. In the case where the given end condition is not satisfied, the process returns to step S301. In the case where the given end condition is satisfied, the process of the flowchart ends.

Figure 4:
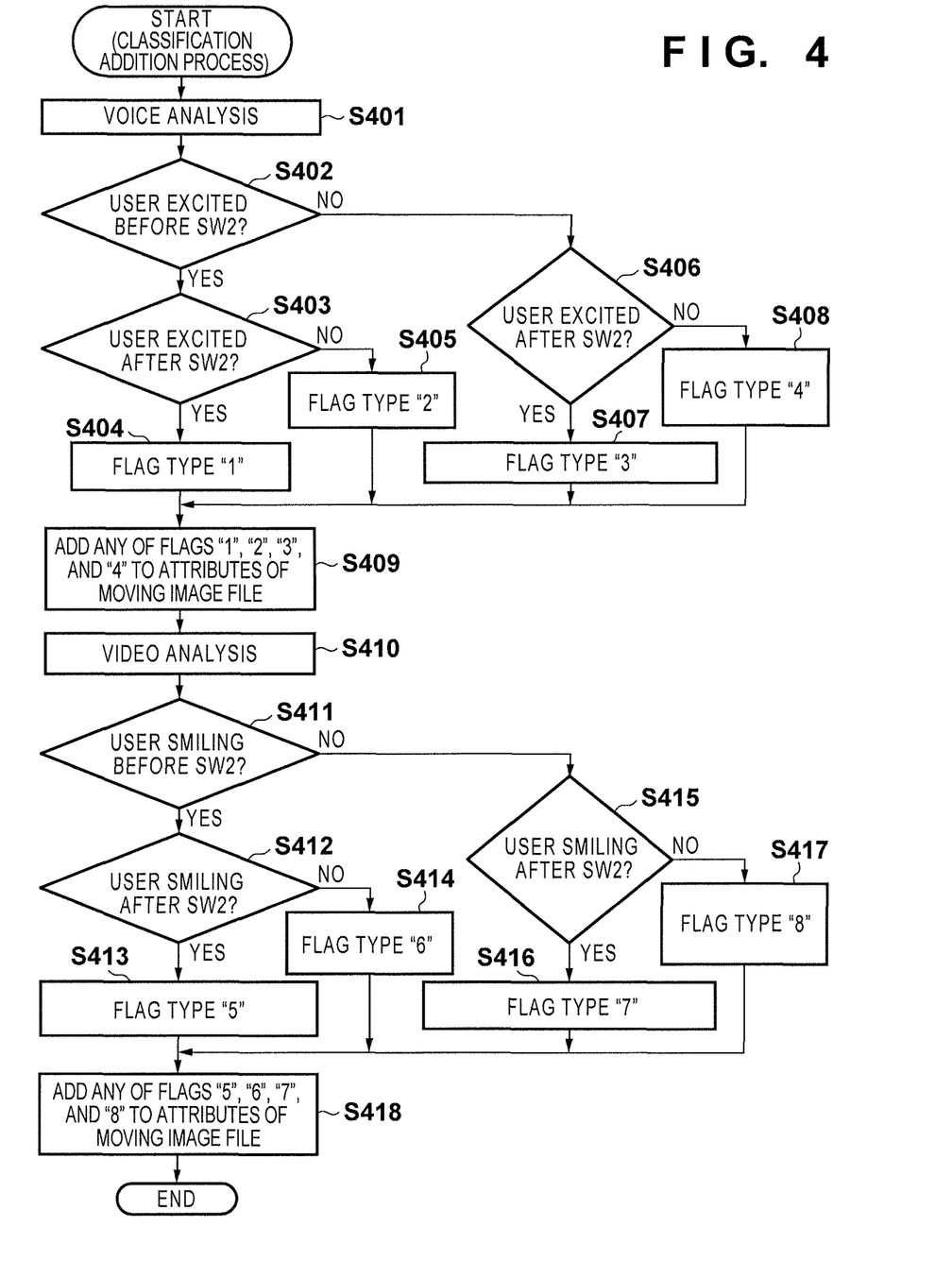
FIG. 4 is a flowchart showing a classification addition process in step S317 in FIG. 3B in detail.

FIG. 4 is a flowchart showing the classification addition process in step S317 in FIG. 3B in detail. Each process in this flowchart is realized by the system control unit 50 expanding, in the system memory 52, the program stored in the nonvolatile memory 56 and executing the program.

In step S401, the system control unit 50 performs voice analysis on the moving image file (the moving image data of the user) generated in step S316. For example, the system control unit 50 detects the volume level of each of the part corresponding to 4 seconds before the second shutter switch signal SW2 is turned on and the part corresponding to 4 seconds after the second shutter switch signal SW2 is turned on, and determines whether or not the detected volume level exceeds a threshold. In the case where the volume level exceeds the threshold, the system control unit 50 determines that the user was excited. In the case where the volume level does not exceed the threshold, the system control unit 50 determines that the user was not excited. Such voice analysis can be realized using any technique widely known in the technical field of content playback apparatuses and the like.

In step S402, the system control unit 50 determines whether or not the user was excited in 4 seconds before the second shutter switch signal SW2 was turned on (before the image of the subject was captured). In the case of determining that the user was excited, the process advances to step S403. In the case of determining that the user was not excited, the process advances to step S406.

In step S403, the system control unit 50 determines whether or not the user was excited in 4 seconds after the second shutter switch signal SW2 was turned on (after the image of the subject was captured). In the case of determining that the user was excited, the system control unit 50 determines that the flag type is "1" in step S404. In the case of determining that the user was not excited, the system control unit 50 determines that the flag type is "2" in step S405. Similarly, in step S406, the system control unit 50 determines whether or not the user was excited in 4 seconds after the second shutter switch signal SW2 was turned on. In the case of determining that the user was excited, the system control unit 50 determines that the flag type is "3" in step S407. In the case of determining that the user was not excited, the system control unit 50 determines that the flag type is "4" in step S408.

The flag (second classification information) is thus determined based on the combination of the state (voice) of the user before image capturing and the state (voice) of the user after image capturing. Here, text data such as classification names may be used as the second classification information, instead of numbers.

In some embodiments, the nonvolatile memory 56 in the digital camera 100 stores table data indicating the correspondence between the combination, of the state (voice) of the user before image capturing and the state (voice) of the user after image capturing, and the flag (or classification name, etc.). The system control unit 50 can obtain the flag (or classification name, etc.) corresponding to the state (voice) of the user, with reference to the table data.

In step S409, the system control unit 50 adds the flag (any of the flags "1", "2", "3", and "4") determined in step S404, S405, S407, or S408 to the attributes of the moving image file, to record the flag. The form in which the flag is added to the attributes of the moving image file will be described later, with reference to FIG. 5. The flags "1", "2", "3", and "4" each indicate the state of voice-related "excitement" and its change, as the state of the user before and after image capturing.

In step S409, the flag may be added to the attributes of the still image file of the subject, instead of or in addition to the attributes of the moving image file. Since the still image file and the moving image file are associated with each other in step S318, even in the case where the flag is added to the attributes of the moving image file, the flag is eventually associated with the still image file and can be used for search for the still image file and the like.

Next, in step S410, the system control unit 50 performs video analysis on the moving image file (the moving image data of the user) generated in step S316. For example, the system control unit 50 calculates the degree of smile of the face image of the user for each of the part corresponding to 4 seconds before the second shutter switch signal SW2 is turned on and the part corresponding to 4 seconds after the second shutter switch signal SW2 is turned on, and determines whether or not the degree of smile exceeds a threshold. In the case where the degree of smile exceeds the threshold, the system control unit 50 determines that the user was smiling. In the case where the degree of smile does not exceed the threshold, the system control unit 50 determines that the user was not smiling. Such video analysis can be realized using any technique widely known in the technical field of image capturing apparatuses and the like.

In step S411, the system control unit 50 determines whether or not the user was smiling in 4 seconds before the second shutter switch signal SW2 was turned on. In the case of determining that the user was smiling, the process advances to step S412. In the case of determining that the user was not smiling, the process advances to step S415.

In step S412, the system control unit 50 determines whether or not the user was smiling in 4 seconds after the second shutter switch signal SW2 was turned on. In the case of determining that the user was smiling, the system control unit 50 determines that the flag type is "5" in step S413. In the case of determining that the user was not smiling, the system control unit 50 determines that the flag type is "6" in step S414. Similarly, in step S415, the system control unit 50 determines whether or not the user was smiling in 4 seconds after the second shutter switch signal SW2 was turned on. In the case of determining that the user was smiling, the system control unit 50 determines that the flag type is "7" in step S416. In the case of determining that the user was not smiling, the system control unit 50 determines that the flag type is "8" in step S417.

The flag (first classification information) is thus determined based on the combination of the state (facial expression) of the user before image capturing and the state (facial expression) of the user after image capturing. Here, text data such as classification names may be used as the first classification information, instead of numbers.

In some embodiments, the nonvolatile memory 56 in the digital camera 100 stores table data indicating the correspondence between the combination, of the state (facial expression) of the user before image capturing and the state (facial expression) of the user after image capturing, and the flag (or classification name, etc.). The system control unit 50 can obtain the flag (or classification name, etc.) corresponding to the state (facial expression) of the user, with reference to the table data.

In step S418, the system control unit 50 adds the flag (any of the flags "5", "6", "7", and "8") determined in step S413, S414, S416, or S417 to the attributes of the moving image file, to record the flag. The system control unit 50 then ends the process of the flowchart. The form in which the flag is added to the attributes of the moving image file will be described later, with reference to FIG. 5. The flags "5", "6", "7", and "8" each indicate the state of facial expression-related "smile" and its change, as the state of the user before and after image capturing.

In step S418, the flag may be added to the attributes of the still image file of the subject, instead of or in addition to the attributes of the moving image file. Since the still image file and the moving image file are associated with each other in step S318, even in the case where the flag is added to the attributes of the moving image file, the flag is eventually associated with the still image file and can be used for search for the still image file and the like.

The flags added to the moving image file or the still image file as a result of the process described above can be used by the user to extract images based on various criteria. As an example, in the case where the user wants to extract an image with a pleasant atmosphere, the user searches for a still image file associated with the flag "1" or "5". As another example, in the case where the user wants to extract an unexpectedly good image, the user searches for a still image file associated with the flag "3" or "7". As yet another example, in the case where the user wants to extract a wide variety of images (e.g. the user wants to create a photo album made up of a wide variety of images), the user extracts a plurality of images that differ in flag type.

Though both voice analysis and video analysis are performed on the moving image file and the respective flags are added in the flowchart, the analysis result of only one of voice analysis and video analysis may be used. Moreover, though whether or not the volume level exceeds the threshold is determined in voice analysis, whether or not a specific frequency component or a specific phrase is detected may be determined for analysis. Likewise, video analysis is not limited to the determination of whether or not the user was smiling. The digital camera 100 may perform any process of detecting the state of the user, such as detecting a specific facial expression or detecting a predetermined gesture.

Though the flag to be added is classified into four types in the determination processes of steps S411, S412, and S415 in the flowchart, the criteria for determining the flag to be added are not limited to those shown in FIG. 4. Besides, all of the four types are not necessarily needed. For example, the system control unit 50 may add the flag "5" to the attributes of the moving image file in the case where the user was smiling before the second shutter switch signal SW2 was turned on and smiling after the second shutter switch signal SW2 was turned on, and add flags based on different criteria from FIG. 4 in other cases. The same applies to the determination processes of steps S402, S403, and S406.

The digital camera 100 may determine whether or not the user's gaze is within the display unit 28, in video analysis. Such a determination process is performed when the through image of the subject is displayed and when the rec review image of the subject is displayed. This enables determination of whether the user's reaction (excitement or smile) is caused by the image (the through image before the second shutter switch signal SW2 is turned on, the rec review image after the second shutter switch signal SW2 is turned on) of the subject displayed on the display unit 28 or caused by any other factor. Such video analysis can be realized using any technique widely known in the technical field of image capturing apparatuses and the like. The digital camera 100 adds a flag relating to the gaze analysis result to the attributes of the moving image file or the still image file to record the flag, as in step S418.

Figure 5:
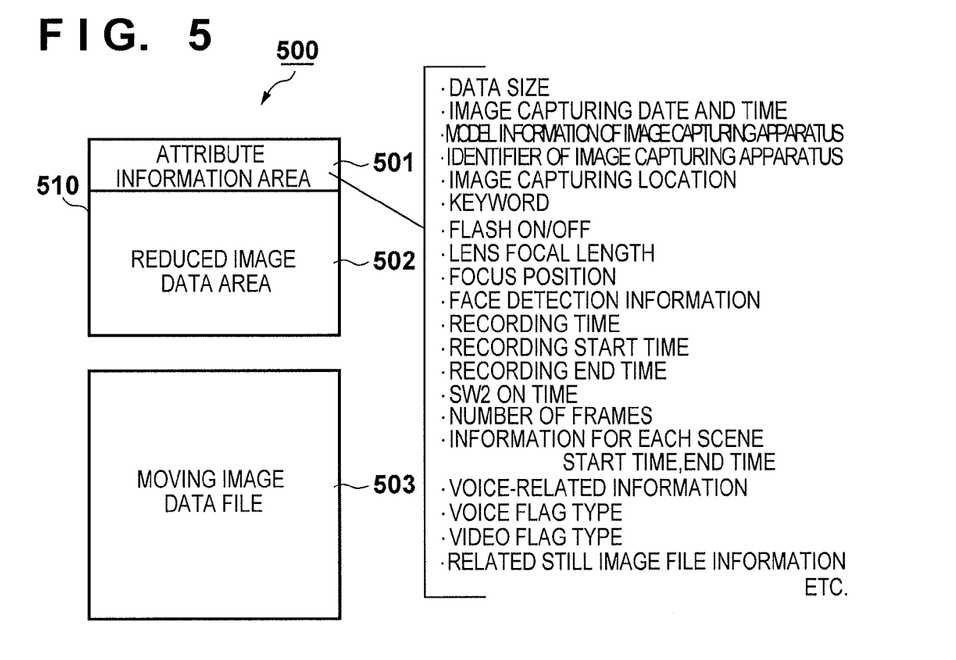
FIG. 5 is a schematic configuration diagram showing a moving image file 500 recorded by the digital camera 100.

FIG. 5 is a schematic configuration diagram showing a moving image file recorded by the digital camera 100. A moving image file 500 includes a moving image information file 510 including an attribute information area 501 and a reduced image data area 502, and a moving image data file 503.

The attribute information area 501 is an area for recording information such as a data size and an image capturing date and time. Moving image-specific information necessary for reading, playback, or selection is also recorded in the attribute information area 501. The moving image-specific information includes a recording time, a recording start time (date and time), a recording end time (date and time), the number of frames played per second, information for each scene, and voice-related information. A "voice flag type" and a "video flag type" respectively for recording the flags added in steps S409 and S418 in FIG. 4 are also recorded in the attribute information area 501. "Related still image file information" indicating the still image file (the still image file of the subject captured by the first image capturing system while the moving image is being captured by the second image capturing system) recorded in association with the moving image file 500 is also recorded in the attribute information area 501. A "SW2 on time" indicating the time of capturing the image of the still image file is also recorded in the attribute information area 501.

The reduced image data area 502 is an area for recording reduced image data displayed upon list display. In this embodiment, reduced image data generated from the data of the frame at the time when the second shutter switch signal SW2 is turned on is recorded in the reduced image data area 502.

The moving image data file 503 is an area for recording all moving image data to be recorded in the moving image file 500. The moving image data file 503 is associated with the moving image information file 510, and the information in the moving image information file 510 is used when playing the moving image data in the moving image data file 503.

Figure 6:
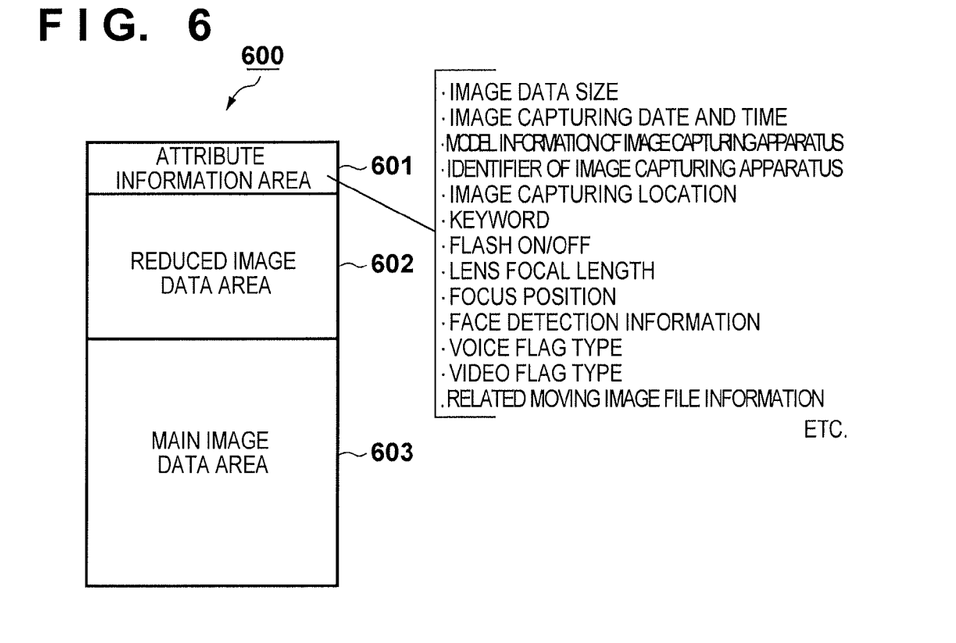
FIG. 6 is a schematic configuration diagram showing a still image file 600 recorded by the digital camera 100.

FIG. 6 is a schematic configuration diagram showing a still image file 600 recorded by the digital camera 100. The still image file 600 includes an attribute information area 601, a reduced image data area 602, and a main image data area 603.

The attribute information area 601 is an area for recording information such as an image data size and an image capturing date and time (SW2 on time). "Related moving image file information" indicating the moving image file (the moving image file of the user captured by the second image capturing system when the still image is captured by the first image capturing system) recorded in association with the still image file 600 is also recorded in the attribute information area 601. As mentioned earlier, each flag relating to the state of the user may also be recorded in the still image file 600. In such a case, a "voice flag type" and a "video flag type" are also recorded in the attribute information area 601.

The reduced image data area 602 is an area for recording reduced image data displayed upon list display. The main image data area 603 is an area for recording the image data of the subject.

As shown in FIGS. 5 and 6, in the moving image file and the still image file captured by the digital camera 100 according to this embodiment, the information associating the files with each other are recorded in the respective attribute information areas. Accordingly, when one file is selected, the digital camera 100 can present its related file. Thus, when the user selects and displays the still image file, the moving image file of the user captured simultaneously can be presented to the user, or the moving image file associated with the still image file can be played together with the still image file.

Though the first image capturing system captures and records only the still image in this embodiment, the digital camera 100 may generate one moving image from a moving image captured before the still image is captured, a moving image obtained by converting the still image, and a moving image captured after the still image is captured and record the generated moving image as a moving image file, as disclosed in International Publication No. 2006/028172. In such a case, the moving image file captured by the first image capturing system and the moving image file captured by the second image capturing system are associated with each other, in the moving image file data form shown in FIG. 5.

As described above, according to the first embodiment, the digital camera 100 captures and analyzes the moving image data of the user before and after the image of the subject is captured, and records information relating to the analysis result in direct or indirect association with the image data of the subject. As a result, the state of the user when capturing the image of the subject can be recognized in more detail than with conventional techniques.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-230525, filed on Nov. 6, 2013, is hereby incorporated by reference herein in its entirety.

What is claimed is:

1. An image capturing apparatus comprising:
a first image capturing device;
a second image capturing device;
a processor; and
a memory having stored thereon instructions that when executed by the processor, cause the processor to:
  capture an image of a subject to generate image data using the first image capturing device;
  capture an image of a user who captures the image of the subject using the second image capturing device, for a predetermined period before and after the image of the subject is captured;
  obtain first classification information by analyzing, in the image captured by the second image capturing device, each of a state of the user before the image of the subject is captured and a state of the user after the image of the subject is captured; and
  record the first classification information in association with the image data.

2. The image capturing apparatus according to claim 1, wherein the first classification information is obtained based on a combination of the state of the user before the image of the subject is captured and the state of the user after the image of the subject is captured.

3. The image capturing apparatus according to claim 2, wherein to obtain is configured to execute at least any of:
obtaining first information as the first classification information, in a case where the state of the user before the image of the subject is captured includes a smile and the state of the user after the image of the subject is captured includes a smile;
obtaining second information as the first classification information, in a case where the state of the user before the image of the subject is captured includes a smile and the state of the user after the image of the subject is captured does not include a smile;
obtaining third information as the first classification information, in a case where the state of the user before the image of the subject is captured does not include a smile and the state of the user after the image of the subject is captured includes a smile; and
obtaining fourth information as the first classification information, in a case where the state of the user before the image of the subject is captured does not include a smile and the state of the user after the image of the subject is captured does not include a smile.

4. The image capturing apparatus according to claim 1, wherein the instructions are further configured to cause the processor to
store the first classification information set beforehand to be added to the image data, based on a combination of the state of the user before the image of the subject is captured and the state of the user after the image of the subject is captured.

5. The image capturing apparatus according to claim 1, further comprising:
a display device,
wherein the instructions are further configured to cause the processor to:
perform control so that a through image of the subject is obtained by the first image capturing device and displayed on the display device before the image of the subject is captured, and the image data is displayed on the display device after the image of the subject is captured; and
determine whether or not a gaze of the user captured by the second image capturing device is directed to the display device,
wherein to determine is configured to perform the determination when the through image is displayed according to the control and when the image data is displayed according to the control, and
to record is configured to record information indicating a result of the determination as to whether or not a gaze of the user captured by the second image capturing device is directed to the display device, in association with the image data.

6. The image capturing apparatus according to claim 1, wherein to record is configured to record moving image data obtained by the second image capturing device, in association with the image data.

7. The image capturing apparatus according to claim 1, wherein the first classification information is based on analysis of a facial expression of the user or based on analysis of a gesture of the user.

8. The image capturing apparatus according to claim 1, wherein to record is configured to record reduced image data that is based on an image obtained by the second image capturing device at a time of capturing the image of the subject, in association with moving image data obtained by the second image capturing device.

9. The image capturing apparatus according to claim 1, wherein the instructions are further configured to cause the processor to
collect voice of the user for the predetermined period, to generate voice data,
wherein to obtain is configured to obtain second classification information, by analyzing each of a part of the voice data corresponding to the voice collected before the image of the subject is captured and a part of the voice data corresponding to the voice collected after the image of the subject is captured, and to record is configured to record the second classification information in association with the image data.

10. The image capturing apparatus according to claim 9, wherein the analysis of the voice data includes determining whether or not a volume level of the voice data exceeds a threshold, and the second classification information includes information indicating a result of the determination as to whether or not a volume level of the voice data exceeds a threshold.

11. An image capturing method by an image capturing apparatus comprising a first image capturing device and a second image capturing device, the image capturing method comprising:

capturing an image of a subject to generate image data using the first image capturing device;

capturing an image of a user who captures the image of the subject using the second image capturing device, for a predetermined period before and after the image of the subject is captured;

obtaining first classification information by analyzing, in the image captured by the second image capturing device, each of a state of the user before the image of the subject is captured and a state of the user after the image of the subject is captured; and recording the first classification information in association with the image data.

12. A non-transitory computer-readable storage medium which stores a program for causing a computer to execute an image capturing method by an image capturing apparatus comprising a first image capturing device and a second image capturing device, the image capturing method comprising:

capturing an image of a subject to generate image data using the first image capturing device;

capturing an image of a user who captures the image of the subject using the second image capturing device, for a predetermined period before and after the image of the subject is captured;

obtaining first classification information by analyzing, in the image captured by the second image capturing device, each of a state of the user before the image of the subject is captured and a state of the user after the image of the subject is captured; and recording the first classification information in association with the image data.

* * * * *